(12) United States Patent
Avritzer et al.

(10) Patent No.: US 7,475,292 B2
(45) Date of Patent: Jan. 6, 2009

(54) SYSTEM AND METHOD FOR TRIGGERING SOFTWARE REJUVENATION USING A CUSTOMER AFFECTING PERFORMANCE METRIC

(75) Inventors: Alberto Avritzer, Mountainside, NJ (US); Andre B. Bondi, Red Bank, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 287 days.

(21) Appl. No.: 11/582,001

(22) Filed: Oct. 17, 2006

(65) Prior Publication Data
US 2007/0094544 A1 Apr. 26, 2007

Related U.S. Application Data

(60) Provisional application No. 60/730,469, filed on Oct. 26, 2005.

(51) Int. Cl.
*G06F 11/00* (2006.01)
(52) U.S. Cl. .......................................... 714/47; 714/38
(58) Field of Classification Search ................... 714/38, 714/47
See application file for complete search history.

(56) References Cited

U.S. PATENT DOCUMENTS

| | | | | |
|---|---|---|---|---|
| 6,026,391 | A * | 2/2000 | Osborn et al. | 707/2 |
| 6,457,143 | B1 * | 9/2002 | Yue | 714/43 |
| 6,725,272 | B1 * | 4/2004 | Susai et al. | 709/229 |
| 6,857,086 | B2 * | 2/2005 | Shaw | 714/55 |
| 7,055,063 | B2 * | 5/2006 | Leymann et al. | 714/16 |
| 7,100,079 | B2 * | 8/2006 | Gross et al. | 714/23 |
| 7,328,127 | B2 * | 2/2008 | Otsuka et al. | 702/182 |
| 2002/0087913 | A1 * | 7/2002 | Harper et al. | 714/15 |
| 2002/0144178 | A1 * | 10/2002 | Castelli et al. | 714/15 |
| 2003/0079154 | A1 * | 4/2003 | Park et al. | 714/1 |
| 2004/0078657 | A1 * | 4/2004 | Gross et al. | 714/15 |
| 2006/0085685 | A1 * | 4/2006 | Cheston et al. | 714/38 |
| 2006/0129367 | A1 * | 6/2006 | Mishra et al. | 703/13 |

* cited by examiner

*Primary Examiner*—Marc Duncan
(74) *Attorney, Agent, or Firm*—Donald B. Paschburg; F. Chau & Associates, LLC

(57) ABSTRACT

A computer-implemented method for triggering a software rejuvenation system and/or method includes receiving a plurality of requests for resources, determining to take a sample of the requests with a probability, determining an estimated average response time to the sample of the requests for resources, determining that the estimated average response time is greater than a first threshold, wherein the first threshold is a mean of an assumed value, determining that a number of estimated average response times greater than the first threshold is greater than or equal to a second threshold, and triggering the software rejuvenation system and/or method.

17 Claims, 5 Drawing Sheets

SYSTEM AND METHOD FOR TRIGGERING SOFTWARE REJUVENATION USING A CUSTOMER AFFECTING PERFORMANCE METRIC

CROSS REFERENCE TO RELATED APPLICATION

This application claims priority to U.S. Provisional Application Ser. No. 60/730,469, filed on Oct. 26, 2005, which is herein incorporated by reference in its entirety.

BACKGROUND OF THE INVENTION

1. Technical Field

The present invention relates to software rejuvenation, and more particularly to a system and method for triggering software rejuvenation using a customer affecting performance metric.

2. Discussion of Related Art

In a large industrial software system extensive monitoring and management is needed to deliver expected performance and reliability. Some specific types of software failures, called soft failures, have been shown to leave the system in a degraded mode, where the system is still operational, but the available system capacity has been reduced.

Soft failures can be caused by the evolution of the state of one or more software data structures during (possibly) prolonged execution. This evolution is called software aging. Software aging has been observed in widely used software.

Soft bugs may occur as a result of problems with synchronization mechanisms, e.g., semaphores; kernel structures, e.g., file table allocations; database management systems, e.g., database lock deadlocks; and other resource allocation mechanisms that are essential to the proper operation of large multi-layer distributed systems. Since some of these resources are designed with self-healing mechanisms, e.g., timeouts, some systems may recover from soft bugs after a period of time.

The current mode of operation employs server based monitoring tools to provide a server health check. This approach may create a gap between a user perception of performance and a monitoring tool view of performance.

Therefore, a need exists for a system and method for triggering software rejuvenation using a customer affecting performance metric.

SUMMARY OF THE INVENTION

According to an embodiment of the present disclosure, a computer-implemented method for triggering a software rejuvenation system and/or method includes receiving a plurality of requests for resources, determining to take a sample of the requests with a probability, determining an estimated average response time to the sample of the requests for resources, determining that the estimated average response time is greater than a first threshold, wherein the first threshold is a mean of an assumed value, determining that a number of estimated average response times greater than the first threshold is greater than or equal to a second threshold, and triggering the software rejuvenation system and/or method.

According to an embodiment of the present disclosure, a computer-implemented method for triggering a software rejuvenation system and/or method includes receiving a plurality of requests for resources, determining to take a sample of the requests with a probability, determining an average response time to the requests for resources corresponding to the sample of the requests, increasing a number of response times greater than a first threshold upon determining that the response time is greater than the first threshold, decreasing the number of response times greater than the first threshold upon determining that the response time is less than the first threshold, determining that the number of response times greater than the first threshold is greater than or equal to a second threshold, and triggering the software rejuvenation system and/or method.

According to an embodiment of the present disclosure, a program storage device is provided readable by machine, tangibly embodying a program of instructions executable by the machine to perform method steps for triggering a software rejuvenation system and/or method. The method includes receiving a plurality of requests for resources, determining to take a sample of the requests according to a probability, determining an estimated average response time to the sample of the requests for resources, determining that the estimated average response time is greater than a first threshold, wherein the first threshold is a mean of an assumed value, determining that a number of estimated average response times greater than the first threshold is greater than or equal to a second threshold, varying the probability of taking the sample with previously sampled values according to a value of the first threshold, and triggering the software rejuvenation system and/or method.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a system and method identifies performance degradation and corrects it using software rejuvenation. The performance degradation of aging software is detected by tracking and responding to changing values of a customer-affecting metric. The system and method ameliorate performance degradation by triggering a software rejuvenation event.

The software rejuvenation event is a pre-emptive restart of a running application or system to prevent future failures. The restart may terminate all threads in execution and release all resources associated with the threads. The software rejuvenation event may include additional activities, such as a backup routine or garbage collection.

The method for identifying performance degradation automatically distinguishes between performance degradation caused by bursts of arrivals (e.g., activity) and performance degradation caused by software aging. The method defines and identifies performance degradation caused by software aging for triggering software rejuvenation by monitoring customer-affecting metrics.

By monitoring user-experienced delays, an example of a customer-affecting metric, the method links a user view of system performance with a tool monitoring view of the system performance. Because customer-affecting metrics are used to trigger a rejuvenation method, the customer view of performance is the same as the tool monitoring system view of performance. In addition, because multiple containers (hereinafter "buckets") are used to count variability in the measured customer affecting metric, degradation that is a function of a transient in the arrival process can be distinguished from degradation that is a function of software aging. Further, sampling and summation of averages of the customer affecting metric can be determined, statistics theorems such as the central limit theorem, can be applied to the sampling and summation to detect system degradation.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
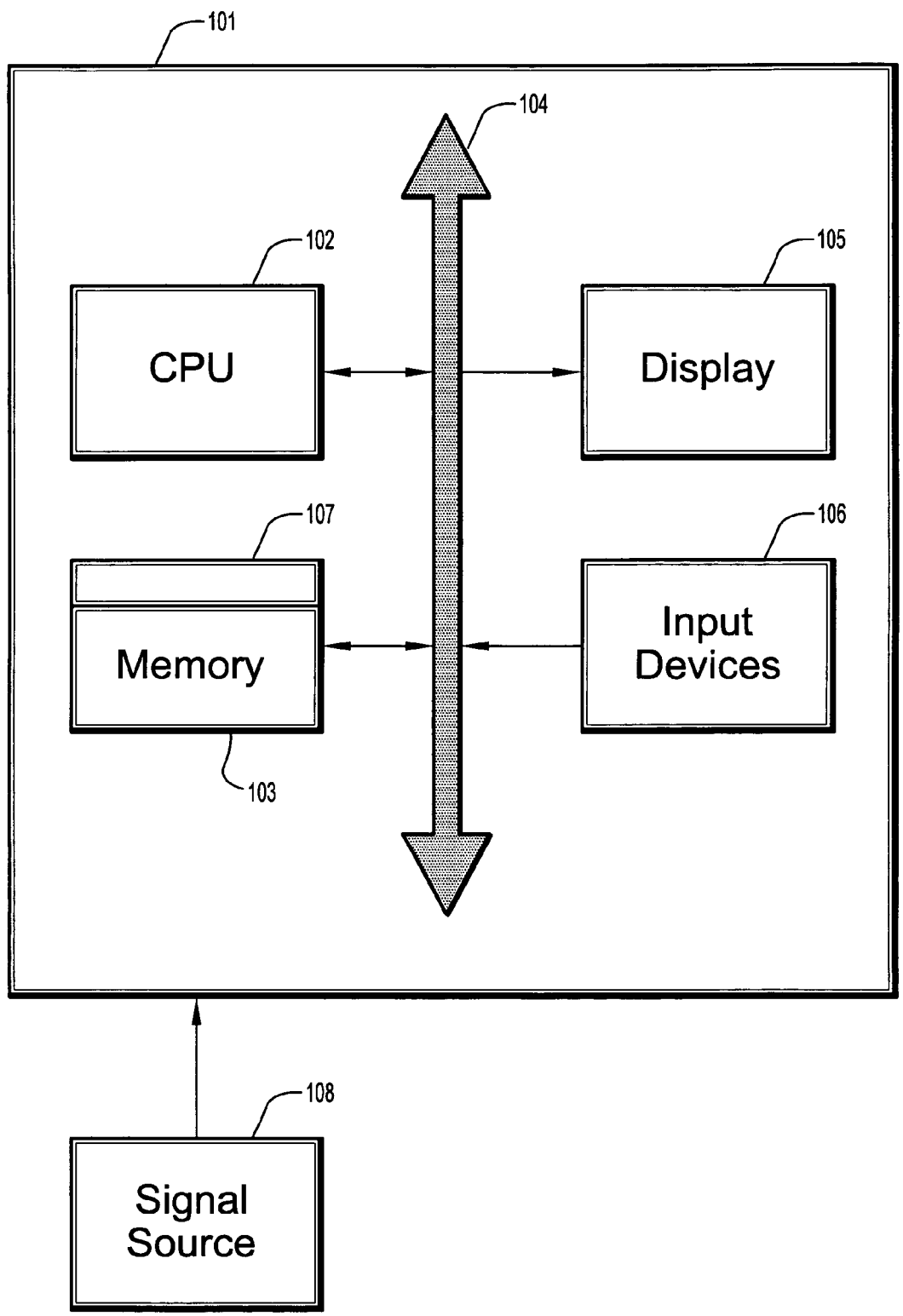
FIG. 1 is a diagram of a system according to an embodiment of the present disclosure.

Referring to FIG. 1, according to an embodiment of the present invention, a computer system 101 for implementing a method of software rejuvenation comprises, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present disclosure, a method distinguishes between performance degradation due to a burst of arrivals and performance degradation due to increased service time as a result of system capacity degradation. For example, if the system is operating at full capacity and a short burst of arrivals is presented, there should be no benefit in executing the preventive maintenance routine. However, if system capacity has been degraded to such an extent that users are effectively locked out of the system, preventive maintenance may be warranted.

In addition, transactions, e.g., client requests, on the software are sampled for increased precision. The sampling is used to obtain an average of a measure of the client requests. A frequency with which the sampling is performed may vary, for example, samples may be taken more or less frequently as a threshold for the trigger for rejuvenation is approached.

A customer affecting metric of performance, for example, a response time, can be sampled in time, such as, every 2 seconds. The customer affecting metric can estimate a time when a computer system is operating at some threshold level, e.g., full capacity. Upon determining that the computer system is operating at or above the threshold level a monitoring tool is deployed in production. Sampling can be performed using, for example, load injectors, deployed at important customer sites. Load injectors create virtual users who take the place of real users operating client software. Transaction requests from one ore more virtual user clients are generated by the load injectors to create a load on one or more servers under test. Thus, an accurate estimate of the average transaction response time request can be determined.

During a window of measurement, samples are taken of transaction response time, when they terminate processing. K represents the total number of buckets available. D represents the depth of each bucket, e.g., the maximum number of occurrences the current bucket will store without overflow. If a last available bucket (e.g., bucket N=K) overflows, a rejuvenation routine is executed.

The levels of each of the K contiguous buckets is tracked. At any given time, the level d of only the $N^{th}$ bucket is considered. N is incremented when the current bucket overflows, i.e., when d first exceeds D, and is decremented when the current bucket is emptied, i.e., when d next takes the value zero.

Figure 2:
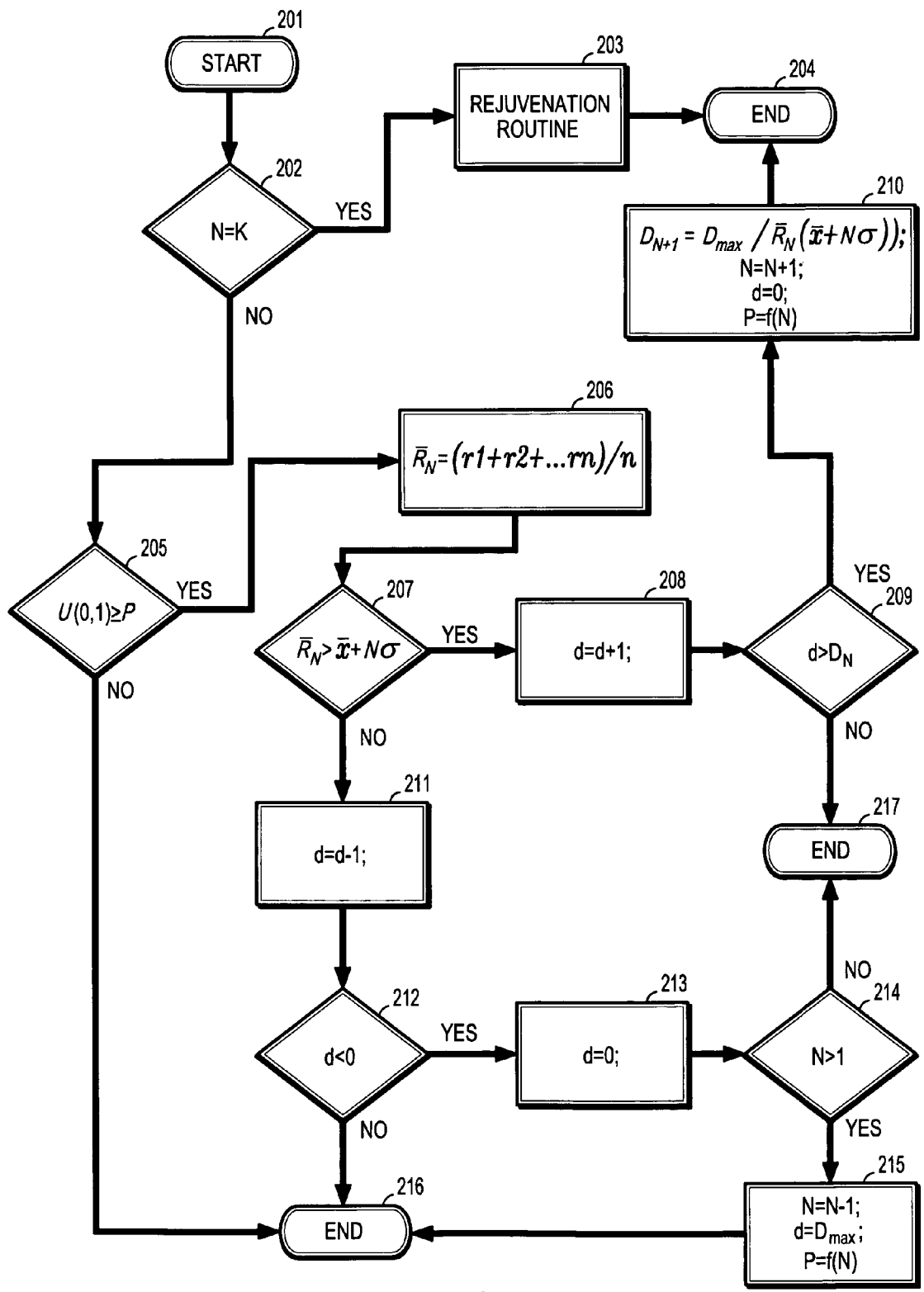
FIG. 2 is a flow chart of a method according to an embodiment of the present disclosure.

The following variables appear in FIG. 2:
N=Current Bucket
K=Number of Buckets
D=Current Depth of Bucket
$D_{max}$=Maximum Depth of Bucket
P=Bernoulli Parameter (initially P=f(1)), wherein f can be a function of N, a function of another measured state of the system, an arbitrary function, etc.
$\overline{R}$=the mean of the last n values of the customer-affecting metric
$\overline{X}$=assumed mean
$\sigma$=assumed standard deviation
U(0,1)=sample from a uniform distribution between 0 and 1.

In FIG. 2,
Let U be drawn from U(0,1), which is a uniform distribution with endpoints 0 and 1.
Let X=1 if $1 \geq U > P$ and X=0 if $D \leq U \leq P$.
Then P(X=1)=P(U>P)=1−P and P(X=0)=P(U≦P)=P.
For a coin with bias P "Heads" corresponds to X=0 and "Tails" corresponds to X=1. The bias may be, for example, 70%, but may be different according to the application.

Referring now to FIG. 2, for a sampled transaction 201 an estimate of current average delay may be determined as:

---

```
if (N == K ) 202
    then
        execute rejuvenation routine 203 and {END} 204
    elseif (U(0,1)≧P) 205
        then
```

-continued

```
        R̄_N=(r1+r2+...rn)/n 206
    if (R̄_N>X̄+Nσ) 207
        then
            do {d := d + 1;} 208
            if (d > D_N) 209
                then
                    do (D_{N+1}=D_max/(R̄_n-(X̄+Nσ)); N := N + 1};
                    d := 0; P=f(N)} 210 and {END} 204
                else
                    do {END}217
        else
            do {d := d - 1;} 211
            if (d < 0) 212
                then
                    do {d := 0;} 213
                    if (N > 1) 214
                        then
                            do {d := D_max; N := N - 1;;
                            P=f(N)} 215 and {END} 216
                        else
                            do {END} 217
                else
                    do {END} 217
    else
        do {End} 216
```

Figure 3:
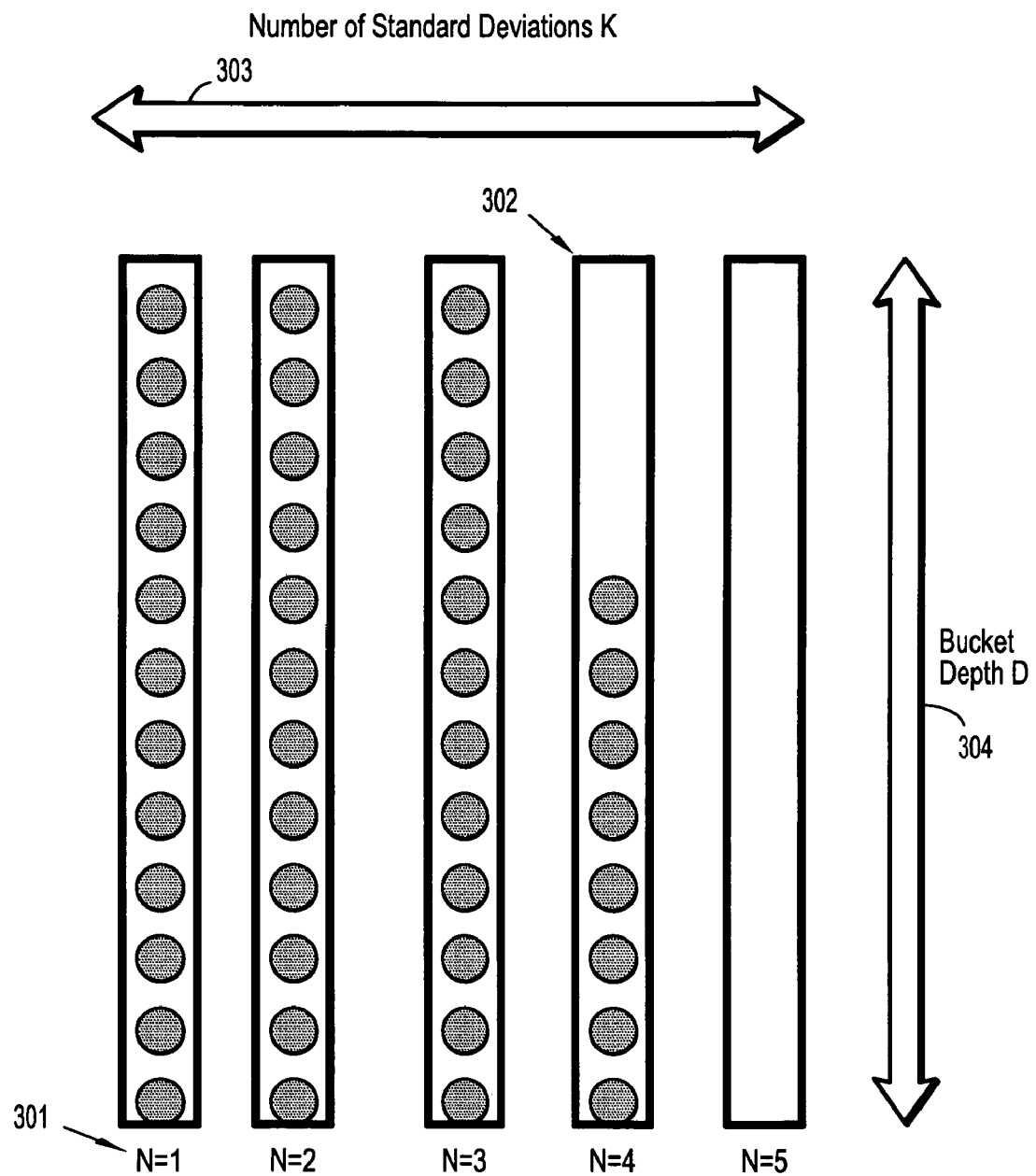
FIG. 3 is an illustration of a method according to an embodiment of the present disclosure.

A method according to an embodiment of the present disclosure is initialized at system startup, e.g., 201, and at rejuvenation 203 with d=0; N=0. Referring to FIG. 3, N represents a bucket index 301; in the example shown in FIG. 3 N=4. d represents the number of balls stored in the current bucket 302; in the example 8 balls are currently in bucket 4. The K contiguous buckets 303 are modeled, tracking the number of balls in each bucket.

Referring to FIG. 2, a coin, which may be bias, is flipped to determine whether to end the routine or continue with a next n observations 205. Upon determining a result P=Heads for the coin flip, the method continues to block 206, wherein the mean of the last n values of the customer-affecting metric is determined. The coin flip is a simulation method for achieving randomness in the system—the random outcome increases efficiency within the system, functioning as a sampling method. In block 207, it is determined whether the mean is greater than an assumed mean plus the assumed standard deviation for a current buck.

The assumed mean and assumed standard deviation may be determined based on previous observations, for example, observation and production of a system, or a load test on a system. For example, one may observe a given hour of a day for two weeks and determine an expected mean and standard deviation, which may be used as the assumed values.

A ball is dropped into the current bucket 208 if a value of a customer-affecting metric such as a measured delay (e.g., a delay in responding to a transaction request) exceeds an assumed mean value 207. A ball is removed from the current bucket 211 if the measured delay is less than the assumed mean value of the customer affecting metric.

When the current bucket overflows 209, an estimation of the expected delay is adjusted by adding one standard deviation to the expected value of the metric 210, moving to the next bucket. If a bucket underflows 212 the one standard deviation is subtracted from the estimation of the expected delay 215, moving to the previous full bucket.

The monitoring system architect or administrator can tune a method's resilience to a burst of arrivals (e.g., transaction requests) by changing the value of D 304. The method's resilience to degradation in the customer affecting metric is adjusted by tuning the value of K. K represents the number of standard deviations from the mean that would be tolerated before the software rejuvenation routine is activated.

A method according to an embodiment of the present disclosure delivers desirable baseline performance at low loads because it is activated when the customer affecting metric exceeds a predetermined target. This performance is achieved by using multiple contiguous buckets to track bursts in the transaction arrival process and a bucket depth to validate the moments in time where the estimate of the performance metric should be changed.

A method according to an embodiment of the present disclosure can be extended to allow for the application of several statistical functions for estimating the customer affecting metric, for example, taking the average of a window of sampling, or the max, or the min, or the median, or the sum; by using deviations whose magnitude varies with N, the index of the current bucket, by setting the current deviation to $\bar{x}+a_N\sigma$ for some set of coefficients $a_N$. The method may also allow for the possibility that the departure rate will decrease as the system degrades by making the bucket depths depend on the value of N. Then, D would be replaced by $D_N$.

According to an embodiment of the present disclosure, a method may be used to monitor the relevant customer affecting metrics in software products and to trigger software rejuvenation whence the estimate of the customer affecting metric exceeds a specified target.

It should be noted that throughout the specification, embodiments have been described using the terms "bucket" and "ball". These terms are analogous to any method for counting the occurrence of an event, for example, in computer science consider an element of an array as a bucket, wherein the array is K elements (e.g., buckets) long and each element stores a number representing a number of times an event has occurred (e.g., balls). One of ordinary skill in the art would appreciate that other methods of tracking a customer-affecting metric are possible.

Figure 4:
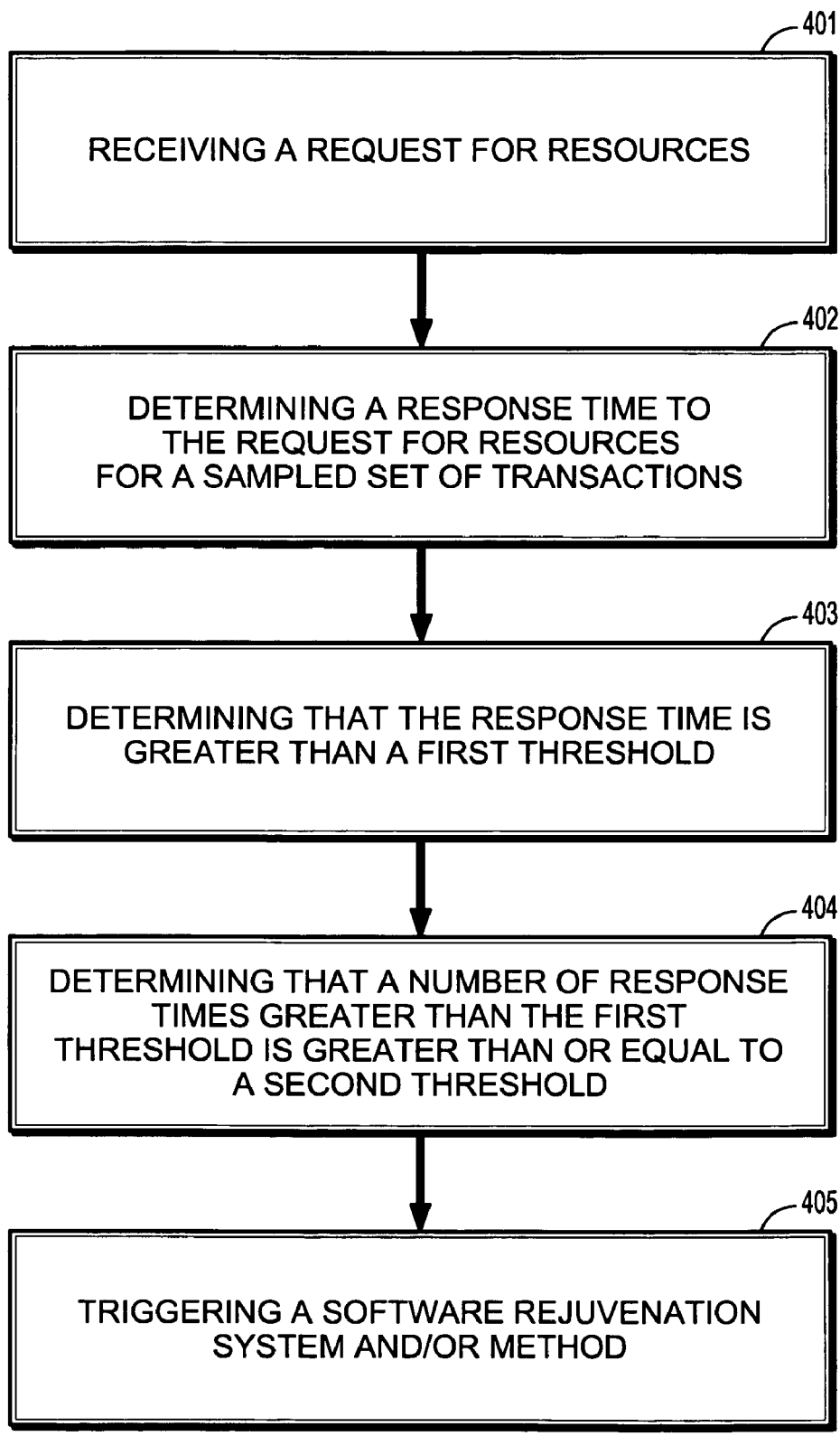
FIG. 4 is a flow chart of a method according to an embodiment of the present disclosure.

Referring to FIG. 4, according to an embodiment of the present disclosure, a method for triggering a software rejuvenation system and/or method includes receiving a request for resources 401, determining a response time to the request for resources for a sampled set of transactions 402, determining that the response time is greater than a first threshold 403, determining that a number of response times greater than the first threshold is greater than a second threshold 404, and triggering the software rejuvenation system and/or method 405. The response time is an example of a customer-affecting metric, other metrics may be used, for example, a number of 404 errors received by a client (e.g., add a ball to a bucket upon receiving a 404 error and subtract a ball from the bucket upon receiving a valid response).

Figure 5:
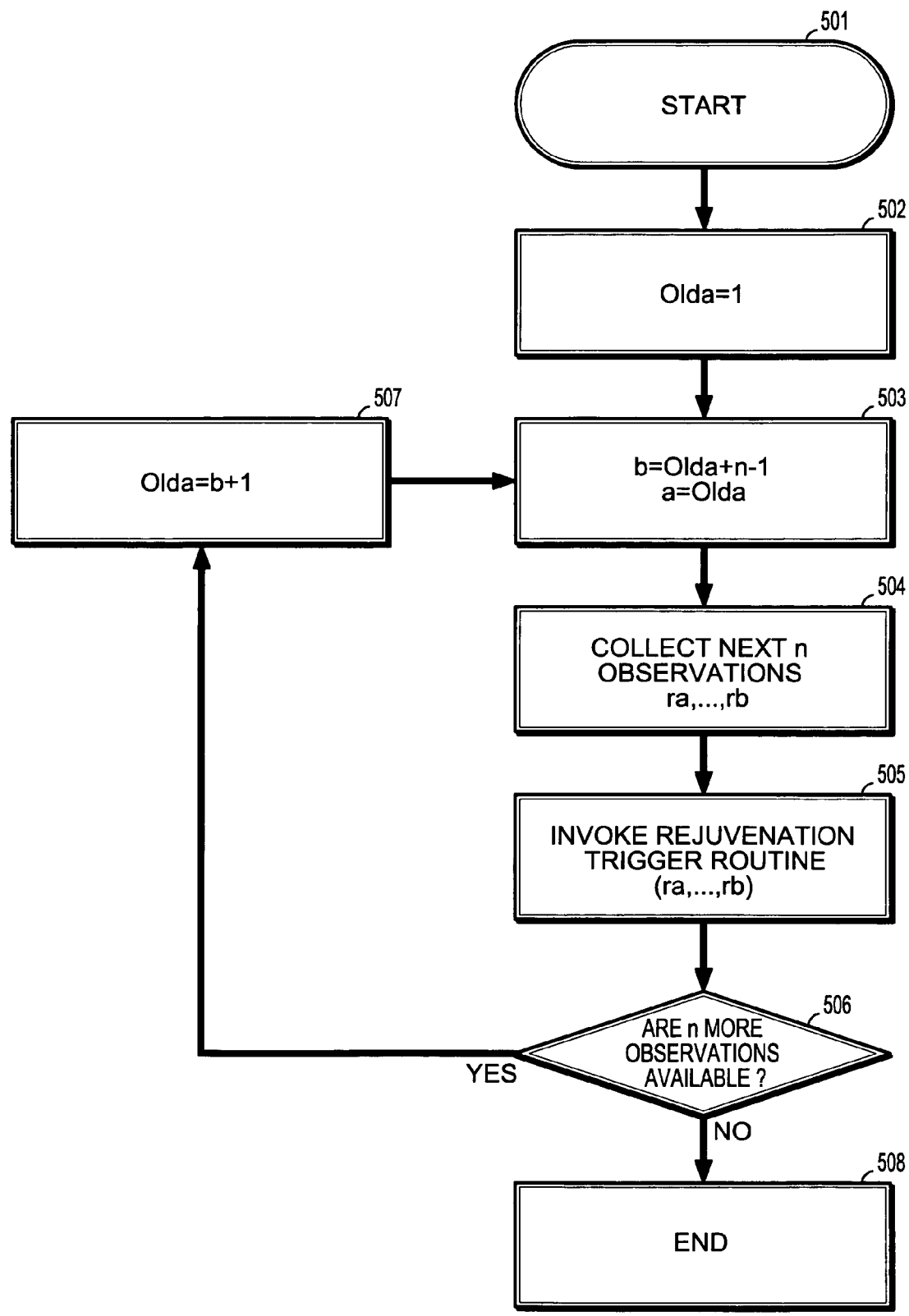
FIG. 5 is a flow chart of a method for triggering a rejuvenation event according to an embodiment of the present disclosure.

Referring to FIG. 5, a methods for invoking a rejuvenation is itself invoked 501 and keeps a left index a of sampled observations or transactions 502, which is initially set to 1. A right index b of sampled observations is set to the left index plus a sample size n, minus 1 503. A set of observations of the size n is collected 504. A rejuvenation trigger is invoked, which analyzes the collected set of observations 505. The method continues to collect observations, if available 506. If additional observations are available, the left index is set to the right index plus 1 507 and the method returns to block 503, otherwise the method ends 508.

Having described embodiments for a system and method for triggering software rejuvenation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for triggering a software rejuvenation system and/or method comprising:
   receiving a plurality of requests for resources;
   determining to take a sample of the requests with a probability;
   determining an estimated average response time to the sample of the requests for resources;
   determining that the estimated average response time is greater than a first threshold, wherein the first threshold is a mean of an assumed value;
   determining that a number of estimated average response times greater than the first threshold is greater than or equal to a second threshold; and
   triggering the software rejuvenation system and/or method.

2. The computer-implemented method of claim 1, further comprising reducing or increasing the probability according to a function.

3. The computer-implemented method of claim 2, wherein reducing or increasing the probability directly affects a frequency with which the sample of the requests for resources is taken.

4. The computer-implemented method of claim 1, wherein the first threshold varies according to a number of estimated response times greater than the first threshold.

5. The computer-implemented method of claim 4, further comprising increasing the first threshold when the number of response times is greater than the first threshold.

6. The computer-implemented method of claim 1, wherein the second threshold is a positive integer.

7. The computer-implemented method of claim 1, further comprising determining the assumed value based on a set of previous observations.

8. The computer-implemented method of claim 1, wherein the probability is fixed.

9. The computer-implemented method of claim 1, wherein the probability is determined by a function.

10. A computer-implemented method for triggering a software rejuvenation system and/or method comprising:
    receiving a plurality of requests for resources;
    determining to take a sample of the requests with a probability;
    determining an average response time to the requests for resources corresponding to the sample of the requests;
    increasing a number of response times greater than a first threshold upon determining that the response time is greater than the first threshold;
    decreasing the number of response times greater than the first threshold upon determining that the response time is less than the first threshold;
    determining that the number of response times greater than the first threshold is greater than or equal to a second threshold; and
    triggering the software rejuvenation system and/or method.

11. The computer-implemented method of claim 10, further comprising reducing or increasing the probability of taking the sample according to a function.

12. The computer-implemented method of claim 10, wherein the first threshold varies according to a number of estimated response times greater than the first threshold.

13. The computer-implemented method of claim 12, further comprising increasing the first threshold with the number of response times greater than the first threshold.

14. The computer-implemented method of claim 10, wherein the second threshold is a positive integer.

15. The computer-implemented method of claim 10, wherein the probability is fixed.

16. The computer-implemented method of claim 10, wherein the probability is determined by a function.

17. A program storage device readable by machine, tangibly embodying a program of instructions executable by the machine to perform method steps for triggering a software rejuvenation system and/or method, the method steps comprising:
    receiving a plurality of requests for resources;
    determining to take a sample of the requests with a probability;
    determining an estimated average response time to the sample of the requests for resources;
    determining that the estimated average response time is greater than a first threshold, wherein the first threshold is a mean of an assumed value;
    determining that a number of estimated average response times greater than the first threshold is greater than or equal to a second threshold;
    varying the probability of taking the sample with previously sampled values according to a value of the first threshold; and
    triggering the software rejuvenation system and/or method.

* * * * *